Figure 1:
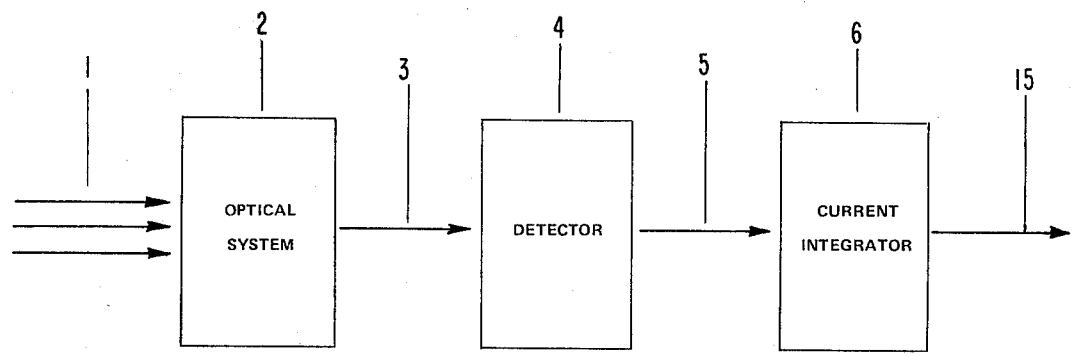

United States Patent [19]

Bahm

[11] 4,015,116
[45] Mar. 29, 1977

[54] MEASUREMENT OF SOLAR RADIATION

[75] Inventor: Raymond J. Bahm, Albuquerque, N. Mex.

[73] Assignee: Rho Sigma Corporation, Van Nuys, Calif.

[22] Filed: Oct. 20, 1975

[21] Appl. No.: 624,111

[52] U.S. Cl. .............................. 250/206; 250/215; 356/215

[51] Int. Cl.² ....................................... H01J 3/14

[58] Field of Search ............... 346/107 R; 354/51; 356/211–222; 324/94; 250/578, 215, 206, 336, 203

[56] References Cited

UNITED STATES PATENTS

| | | | |
|---|---|---|---|
| 1,725,651 | 8/1929 | Koller | 356/215 |
| 2,782,088 | 2/1957 | Davis | 346/107 R |
| 3,198,945 | 8/1965 | Dewes | 324/94 |
| 3,272,104 | 9/1966 | Lytton | 356/222 |
| 3,405,274 | 10/1968 | Lakin | 324/94 |
| 3,418,479 | 12/1968 | Schmitt | 356/215 |
| 3,442,190 | 5/1969 | Erickson | 354/51 |
| 3,533,348 | 10/1970 | Yanagi | 354/51 |
| 3,809,905 | 5/1974 | Suga | 324/94 |

Primary Examiner—Harold A. Dixon

[57] ABSTRACT

This solar radiation measuring system records the integral of total solar radiation over a given period of time, and also records the periods during that time when the sun was obscured by clouds or other objects. The measurement of the integral of solar radiation includes all spectral components of the solar spectrum from the ultra-violet through the infrared. The design of the device is such that readout is simple and complex data reduction is unnecessary.

5 Claims, 6 Drawing Figures

U.S. Patent  Mar. 29, 1977  Sheet 2 of 2  4,015,116

MEASUREMENT OF SOLAR RADIATION

My invention relates to a new device comprising two elements which used together will allow the accurate measurement and recording of solar radiation. The first element is an integrating solar radiometer (hereinafter called the "radiometer") which gives a measure of the total amount of solar radiation falling on it over a given period of time. The second element hereinafter called the "recorder" gives a record of the presence or absence of direct solar radiation over a given period of time. Thus the radiometer, registering accurately the total radiation and the recorder, registering the times of sunshine or cloudiness, together provide a complete system for recording solar radiation. Both elements are simple, easy to construct and can be assembled from readily available components.

An object of this invention is to provide an improved method for measuring and recording solar radiation.

Another object of this invention is to provide a low-cost method for measuring and recording solar radiation.

Yet another object of this invention is to provide a solar radiation measuring and recording system which can be left unattended for long periods of time.

Still another object of this invention is to provide a solar radiation and recording system which can be used by untrained personnel.

A further object of this invention is the incorporation of radiation sensing information processing, recording and storage into one package, which provides simple readout without complex external information processing.

With these and other objects in view which may be incident to my improvements, the invention consists in the parts and combinations hereinafter set forth and claimed, with the understanding that the several necessary elements comprising my invention may be varied in the construction, proportions and arrangement without departing from the spirit and scope of the appended claims.

In order to make my invention more clearly understood, I have shown in the accompanying drawings means for carrying the same into practical effect, without limiting the devices in their useful applications to the particular constructions which, for the purpose of explanation have been made the subject of illustration.

Figure 2:
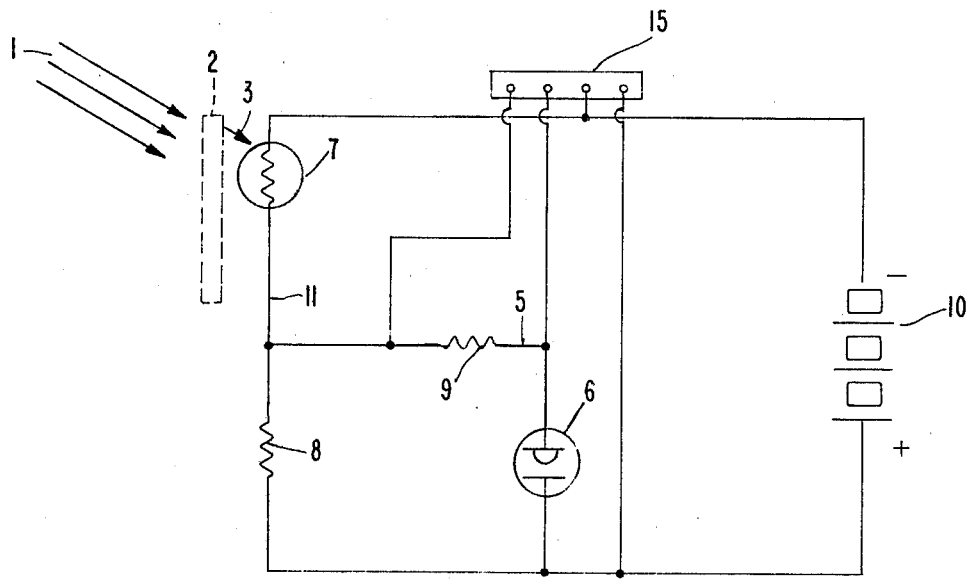
Figure 3:
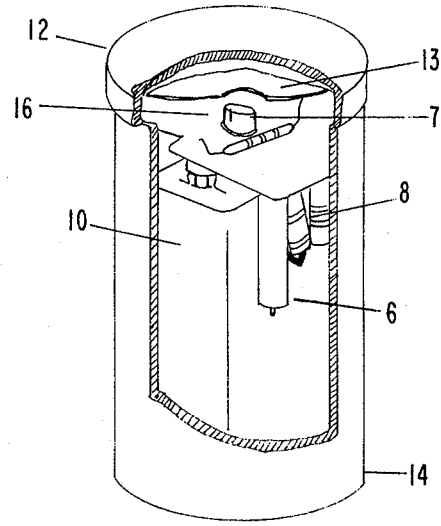
Figure 4:
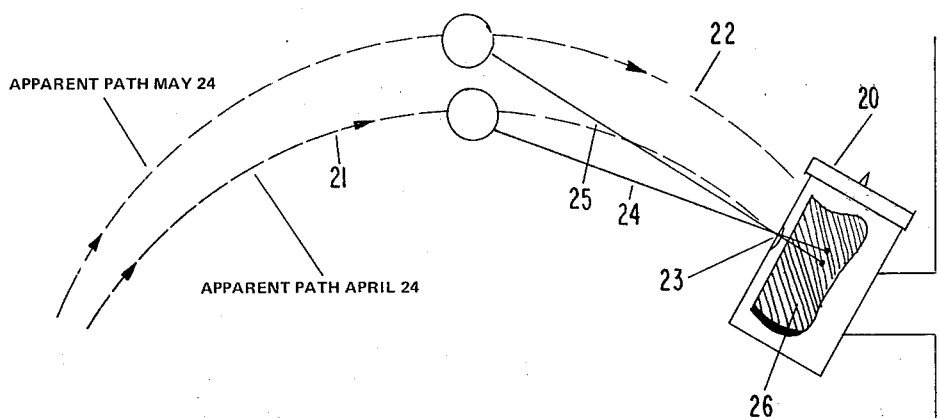

Other objects, purposes and characteristic features of the present invention will in part be pointed out as the description of the present invention progresses and in part be obvious from the accompanying drawings wherein:

FIG. 1 is a block diagram illustrating the basic concept of the radiometer element, FIG. 2 is a schematic diagram illustrating one embodiment of the electrical circuit of the radiometer element of this invention, FIG. 3 is a cut-away view showing the arrangement of components in one embodiment of the radiometer element of this invention, FIG. 4 is an illustration of the apparent paths of the sun at two dates showing how the direct rays of radiation will be recorded individually by the recorder element at different dates.

Figure 5:
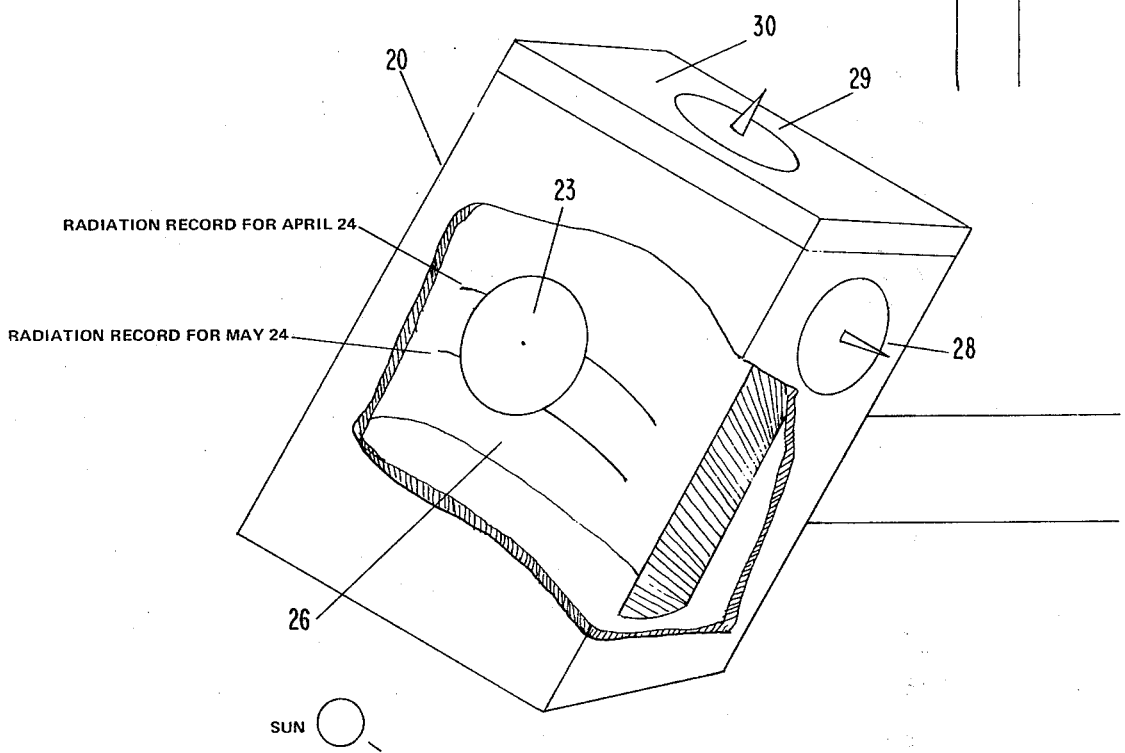
Figure 6:
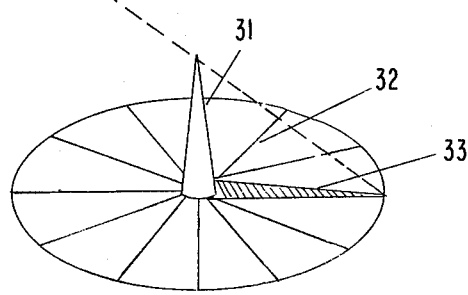

FIG. 5 is an illustration of the various components of the recorder element showing their interrelationships in one embodiment of the system, FIG. 6 is an illustration of one of the sights used for orienting the recorder element.

Briefly the radiometer element of my invention comprises: an optical system to alter the direction of the incident solar radiation and to alter the intensity of its various spectral components in such a manner that the detector output current shall be proportional to the cosine of the angle between a line normal to the front of the radiometer and the direction incoming radiation, said detector output current shall also be proportional to the amount of solar energy incident upon the front of the device; a detector which in combination with the optical system produces an output current proportional to the instantaneous solar energy incident on the front of the device; an integrating element the state of which is proportinal to the total current it receives; and a readout means for determining the state of the integrating element.

Referring to the drawings, and more particularly to FIGS. 1-3, the radiometer for measuring the incident solar radiation 1 comprises an optical system 2 altering the direction and the intensity of the spectral components of the incoming radiation to produce radiation 3 suitable for the detector 4.

The optical system 2 comprises in the embodiment of FIG. 3 a diffusing filter 12 to alter the path of the radiation, and a spectral filter 13 to alter the intensity of the spectral components of the radiation in a manner suitable for the detector.

The detector 4 comprises in the embodiment of FIGS. 2 and 3 a constant voltage source or battery 10, a photoresistive cell or element 7 which has a resistance inversely proportional to the energy incident upon it 3, and a current divider composed of two resistors 8 and 9, such tht only a fraction of the current through the photoresistive cell passes through the integrating element 6. Said fraction of the current is directly proportional to the total current. The components of the detector and the integrating element are mounted on a printed circuit board 16 for support and electrical interconnection.

The entire device except for the diffusing filter is contained in a weatherproof housing 14, wherein the diffusing filter 12 forms both the cap for the housing and a part of the optical system. The outer surface of the diffusing filter is flat and is designated the front of the device.

The readout means for determining the state of the integrating element is provided by a connector 15 by which electrical contact may be made to the necessary points of the circuit.

A mechanism for reading out the state of the integrating element is not part of this invention.

Briefly the recorder element of this invention uses an optical system to form an image of the solar disk on a radiation sensitive medium located in the image plane of the optical system. The radiation sensitive medium is located in an enclosure such that all radiation except for that image from the optical system is excluded. The recorder is fixed to the earth's surface oriented in such a manner that as the sun moves in its daily apparent motion across the sky, the image of the sun formed by the optical system also moves across the radiation sensitive medium, thus forming a mark or latent image in that medium. As the hours or minutes of the day pass, the apparent position of the sun moves from east to west across the sky, making a line record or the latent image of a line in the recording medium. As the days of the year pass, the apparent position of the path in the sky is higher or lower from the observer's horizon and hence the record of its passage will each day be a different line on the recording medium. If the radiation sensitive medium is such that different intensities of the solar image are recorded differently on that medium, then as the sun is obscured partly or totally by clouds, haze or other objects, that fact will be recorded on the recording medium as a difference in the line or latent image.

Referring to the drawings and more particularly to FIG. 4, an example is shown of the recorder 20 affixed to the earth's surface recording the apparent paths of the sun across the sky on two different days: the April 24 path 21 and the May 24 path 22. The direct rays of the sun 24 from April 24 and the direct rays 25 from May 24 pass thrugh the optical system 23 forming images on the recording medium 26 at different places.

Referring to FIG. 5 a cut-away drawing of one embodiment of the recorder is shown. The optical system in this embodiment is a pinhold 23 and the recording medium is shaped into a half-cylinder. The enclosure 20 is mounted so that it may be adjusted to make the axis of the cylinder of the recording surface parallel to the earth's axis of rotation. Sights 28 and 29 are provided to aid in proper alignment of the recorder.

Referring to FIG. 6, each sight is comprised of a conical-shaped pedestal 31 in the center of an angular scale 32. The pedestal 31 will cast a shadow 33 on the scale 32 indicating the orientation of the recorder with respect to the sun, making it possible to orient the recorder exactly with respect to the sun.

The recorder is provided with a cover 30 which may be opened allowing removal and exchange of the radiation sensitive medium 26.

When the information about sunshine is desired the radiation sensitive medium is removed and if necessary, processed to develop the latent image. Many existing photographic materials are available to serve as the radiation sensitive medium. The amount of exposure of the radiation sensitive medium is adjusted so that reflected or indirect rays of the sun are not recorded.

I claim as my invention:

1. A solar radiation measuring and recording system comprising:
   an integrating solar radiometer and a solar recorder,
   said integrating solar radiometer comprising:
   a constant voltage source, a photo-resistive element, and a current integrating device connected in series,
   said photo-resistive element having an electrical resistance inversely proportional to the radiation falling thereupon to produce a detectable change of state therewithin to control the current passing through said current integrating device,
   and said solar recorder comprising:
   a light-tight enclosure having a pin hole therein,
   a medium, sensitive to a portion of the solar spectrum to create a change of state in said medium, located within said enclosure, whereby only direct rays from said portion of the solar spectrum which pass through the pin hole impinge upon said medium,
   and at least one sight attached to said enclosure,
   said at least one sight comprising: a circular angular scale having equiangular divisions on a flat surface upon said enclosure, and a conical shaped pedestal in the center of said scale having the axis of the cone normal to said flat surface and the base of said pedestal lying in the same plane and said flat surface.

2. The apparatus of claim 1 wherein said medium is of a photographic material.

3. The apparatus of claim 1 further comprising a diffusing filter to alter the path of the radiation passing therethrough fall upon said photo-resistive element.

4. An integrating solar radiometer for measuring solar radiation for up to long periods of time comprising:
   a container,
   a flat diffusing filter to alter the path of the radiation incident thereupon forming a cap upon said container to produce a weatherproofing housing with said container,
   a spectral filter adjacent said cap within said container to alter the intensity of spectral components of the incident radiation,
   a battery, a photo-resistive cell and a current integrating element connected in series within said container whereby said altered spectral components are incident upon said photo-resistive cell to control current passing through said series circuit to be integrated by said integrating element for readout after a given period of time.

5. The method of measuring the intensity of the sun and the presence and absence of solar radiation over a predetermined period of time comprising:
   providing a portable solar integrating radiometer,
   providing a portable solar recorder for use in conjunction with said radiometer,
   aligning said radiometer and said recorder to permit the radiation from the sun to impinge thereupon,
   providing a radiation sensitive medium within said recorder behind a pin hole therein,
   permitting a portion of the sun's radiation to pass through said pin hole to sweep across said sensitive medium to produce a image thereupon,
   and measuring the integrated radiation detected by said radiometer after a predetermined period of time.

* * * * *